(12) United States Patent
Kamilov et al.

(10) Patent No.: US 10,657,446 B2
(45) Date of Patent: May 19, 2020

(54) SPARSITY ENFORCING NEURAL NETWORK

(71) Applicant: Mitsubishi Electric Research Laboratories, Inc., Cambridge, MA (US)

(72) Inventors: Ulugbek Kamilov, Cambridge, MA (US); Hassan Mansour, Boston, MA (US); Dehong Liu, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/649,822

(22) Filed: Jul. 14, 2017

(65) Prior Publication Data

US 2018/0349771 A1    Dec. 6, 2018

Related U.S. Application Data

(60) Provisional application No. 62/514,175, filed on Jun. 2, 2017.

(51) Int. Cl.
*G06N 3/08* (2006.01)
*G06T 11/00* (2006.01)

(52) U.S. Cl.
CPC ............ *G06N 3/084* (2013.01); *G06T 11/003* (2013.01); *G06T 11/006* (2013.01); *G06T 2207/20084* (2013.01)

(58) Field of Classification Search
CPC .................. G06N 3/084; G06T 11/003; G06T 2207/20084
See application file for complete search history.

(56) References Cited

U.S. PATENT DOCUMENTS

| 4,562,540 A | 12/1985 | Devaney |
| 4,679,866 A * | 7/1987 | van Zanten ........... B60T 8/1766 303/167 |

(Continued)

FOREIGN PATENT DOCUMENTS

| CN | 102955159 | 7/2014 |
| CN | 104866900 | 8/2015 |
| WO | 2008129553 | 10/2008 |

OTHER PUBLICATIONS

Mellouli et al., Deep Neural Network with RBF and Sparse auto-encoders for Numeral Recognition, IEEE-2015 15th International Conference on Intelligent Systems design and Applications (ISDA) (Year: 2015).*

(Continued)

*Primary Examiner* — John W Lee
(74) *Attorney, Agent, or Firm* — Gennadiy Vinokur; James McAleenan; Hironori Tsukamoto

(57) ABSTRACT

Systems and methods for a computer implemented image reconstruction system that includes an input interface to receive measurements of a scene. A memory to store a sparsity enforcing neural network (SENN) formed by layers of nodes propagating messages through the layers. Wherein at least one node of the SENN modifies an incoming message with a non-linear function to produce an outgoing message and propagates the outgoing message to another node of the SENN. Wherein the non-linear function is a dual-projection function that limits the incoming message if the incoming message exceeds a threshold. Such that, the SENN is trained to reconstruct an image of the scene from the measurements of the scene. A processor to process the measurements with the SENN to reconstruct the image of the scene. Finally, an output interface to render the reconstructed image of the scene.

17 Claims, 10 Drawing Sheets

```
1:  procedure SPARSITYENFORCINGERRORBACKPROPAGATION
2:    input:  true image x, output of sparsity model xᵗ, output of physical
              model zᵗ, parameters α, γ ∈ ℝ₊, convolution kernels D_{tk} = {D_{tkℓ}}_{ℓ∈[1,...,L]},
              sparsity iterates {sᵏ}_{k∈[1,...,K]}
3:    initialize:  rᴷ ← γD_{tK}(x − xᵗ)
4:    for k = K, K − 1, K − 2, . . . , 1 do
5:        v^{k−1} ← diag(𝒫'_∞(sᵏ))rᵏ
6:        r^{k−1} ← v^{k−1} − αγ²D_{tk}D_{tk}^T v^{k−1}
7:        for ℓ = 1, 2, 3, . . . , L do
8:            if k = K then
9:                q_{kℓ} ← γ(𝒫_∞(z_ℓᵏ)•(x−xᵗ))+αγ [(v_ℓ^{k−1} • (zᵗ − γD_{tk}^T sᵏ)) − γ(s_ℓᵏ • (D_{tk}^T v^{k−1}))]
10:           else
11:               q_{kℓ} ← αγ [(v_ℓ^{k−1} • (zᵗ − γD_{tk}^T sᵏ)) − γ(s_ℓᵏ • (D_{tk}^T v^{k−1}))]
12:   output:  gradients {∇ℰ(D_{tk})}_{tk}
```

(56) References Cited

U.S. PATENT DOCUMENTS

| | | | |
|---|---|---|---|
| 5,729,660 | A | 3/1998 | Chiabrera et al. |
| 6,208,982 | B1 | 3/2001 | Allen, Jr. et al. |
| 7,809,427 | B2 | 10/2010 | Winters et al. |
| 9,633,306 | B2 | 4/2017 | Liu et al. |
| 2009/0244570 | A1* | 10/2009 | Tsuji ............... G06K 9/00248 358/1.9 |
| 2010/0235129 | A1 | 9/2010 | Sharma et al. |
| 2011/0285910 | A1 | 11/2011 | Bamji et al. |
| 2012/0140061 | A1 | 6/2012 | Zeng et al. |
| 2015/0317781 | A1 | 11/2015 | Napier et al. |
| 2016/0065824 | A1 | 3/2016 | Geng et al. |
| 2017/0083754 | A1 | 3/2017 | Tang et al. |
| 2018/0046905 | A1* | 2/2018 | Li ................... G06N 3/0454 |
| 2018/0059679 | A1* | 3/2018 | Taimouri ........... G06N 3/0454 |

OTHER PUBLICATIONS

Liu et al., "Sparse Convolutional Neural Network," 2015, IEEE, pp. 806-814 (Year: 2015).*

J. Park, H. Kim, Y.-W. Tai, M. S. Brown, and I. Kweon, "High quality depth map upsampling for 3D-TOF cameras," in Proc. IEEE Int. Conf. Comp. Vis., Barcelona, Spain, Nov. 6-13, 2011, pp. 1623-1630.

Y. Li, T. Xue, L. Sun, and J. Liu, "Joint example-based depth map super-resolution," in Proc. IEEE Int. Con. Multi. Melbourne, VIC, Australia, Jul. 9-13, 2012, pp. 152-157.

D. Ferstl, C. Reinbacher, R. Ranftl, M. Ruether, and H Bischof, "Image guided depth upsampling using anisotropic total generalized variation," in Proc. IEEE Int. Conf. Comp. Vis., Sydney, NSW, Australia, Dec. 1-8, 2013, pp. 993-1000.

M.-Y. Liu, O. Tuzel, and Y. Taguchi, "Joint geodesic upsampling of depth images," in Proc. IEEE CVPR, Portland, OR, USA, Jun. 23-28, 2013, pp. 169-176.

J. Williams, K.-L. Low, C. Hantak, M. Pollefeys, and A. Lastra, "Automatic image alignment for 3D environment modeling," in Proc. IEEE SIBGRAPI, Curitiba, PR, Brazil, Oct. 17-20, 2004, 388-395.

G. Pandey, J.R. McBride, S. Savarese, and R.M. Eustice, "Automatic extrinsic calibration of vision and lidar by maximizing mutual information," Journal of Field Robotics, vol. 32, No. 5, pp. 1-27, Aug. 2014.

J. Levinson and S. Thrun, "Automatic online calibration of cameras and lasers," in Robotics: Science and Systems, Berlin, Germany, Jun. 24-28, 2013, pp. 29-36.

Kamal Belkebir and Anne Sentenac. High-resolution optical diffraction microscopy. J. Opt. Soc. Am. A, 20(7)1223-1229, Jul. 2003.

W. C. Chew and Y. M. Wang. Reconstruction of two-dimensional permittivity distribution using the distorted Born iterative method. IEEE Trans. Med. Imag., 9(2):218-225, Jun. 1990.

R. E. Kleinman and P. M. van den Berg. A modified gradient method for two-dimensional problems in tomography. J. Comput. Appl. Math., 42(1):17-35, 1992.

R. E. Kleinman and P. M. van den Berg. An extended range-modified gradient technique for profile inversion. Radio Sci., 28(5):877-884, Sep.-Oct. 1993.

A. G. Tijhuis. Born-type reconstruction of material parameters of an inhomogeneous, lossy dielectric slab from reflected-field data. Wave Motion, 11(2):151-173, May 1989.

P. M. van den Berg and R. E. Kleinman. A contrast source inversion method. Inv. Probl., 13(6):1607-1620, Dec. 1997.

Y. M. Wang and W. C. Chew. An iterative solution of the two-dimensional electromagnetic inverse scattering problem. Int. J. Imag. Syst Tech., 1:100-108, 1989.

K. H. Jin, M. T. McCann, E. Froustey, and M. Unser. Deep convolutional neural network for inverse problems in imaging. 2016. arXiv:1611.03679 [cs.CV].

R. Chalasani, J. C. Principe, and N. Ramakrishnan, "A fast proximal method for convolutional sparse coding," in Proceedings of the International Joint Conference on Neural Networks (IJCNN), Aug. 2013, pp. 1-5. doi:10.1109/IJCNN.2013.6706854.

B. Liu, M. Wang, H. Foroosh, M. Tappen, and M. Pensky. Sparse convolutional neural networks. In CVPR, 2015.

* cited by examiner

1: procedure FORWARDPASSSENN
2: input: measurements $\mathbf{y}$, observation matrix $\mathbf{H}$, parameters $\alpha, \gamma \in \mathbb{R}_+$, convolution kernels $\mathbf{D}_{tk} = \{\mathbf{D}_{tk\ell}\}_{\ell \in [1,\ldots,L]}$
3: initialize: $\mathbf{x}^0 \leftarrow \mathbf{0}$ and $\mathbf{g}_{\text{init}} \leftarrow \mathbf{0}$
4: for $t = 1, 2, 3, \ldots, T$ do
5:     Physical model layer:
6:     $\mathbf{z}^t \leftarrow \mathbf{x}^{t-1} - \gamma \mathbf{H}^T(\mathbf{H}\mathbf{x}^{t-1} - \mathbf{y})$;
7:     Sparsity model layers:
8:     $\mathbf{g}^0 \leftarrow \mathbf{g}_{\text{init}}$;
9:     for $k = 1, 2, 3, \ldots, K$ do
10:         $\mathbf{s}^k \leftarrow \mathbf{g}^{k-1} - \alpha\gamma\mathbf{D}_{tk}(\gamma\mathbf{D}_{tk}^T\mathbf{g}^{k-1} - \mathbf{z}^t)$;
11:         $\mathbf{g}^k \leftarrow \mathcal{P}_\infty(\mathbf{s}^k)$;
12:     $\mathbf{g}_{\text{init}} \leftarrow \mathbf{g}^K$;
13:     $\mathbf{x}^t \leftarrow \mathbf{z}^t - \gamma\mathbf{D}_{tK}^T\mathbf{g}^K$;
14: output: reconstructed image $\mathbf{x}^T$

FIG. 2C

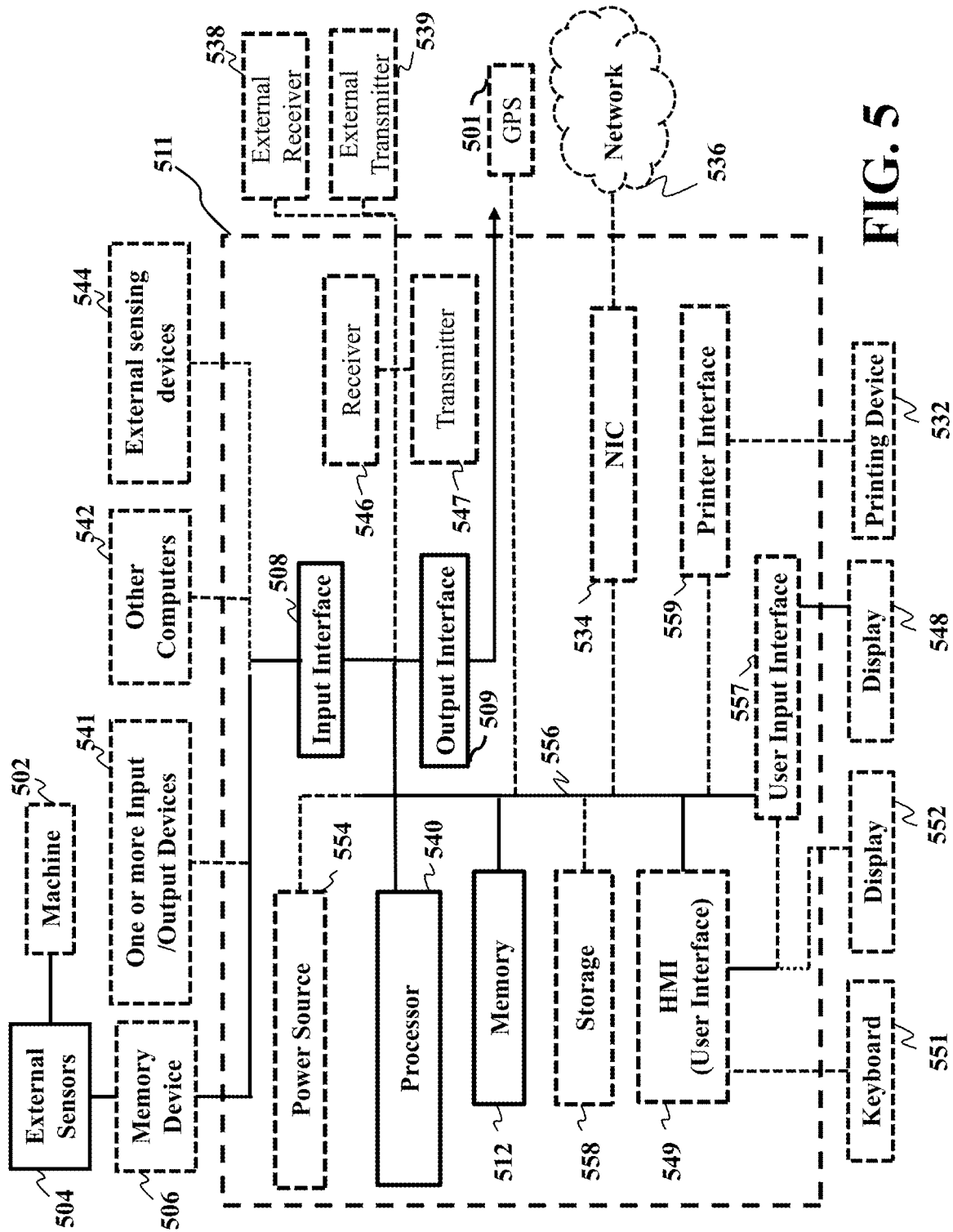

1: procedure SPARSITYENFORCINGERRORBACKPROPAGATION
2: input: true image $\mathbf{x}$, output of sparsity model $\mathbf{x}^t$, output of physical model $\mathbf{z}^t$, parameters $\alpha, \gamma \in \mathbb{R}_+$, convolution kernels $\mathbf{D}_{tk} = \{\mathbf{D}_{tk\ell}\}_{\ell \in [1,\ldots,L]}$, sparsity iterates $\{\mathbf{s}^k\}_{k \in [1,\ldots,K]}$
3:  initialize: $\mathbf{r}^K \leftarrow \gamma \mathbf{D}_{tK}(\mathbf{x} - \mathbf{x}^t)$
4:  for $k = K, K-1, K-2, \ldots, 1$ do
5:   $\mathbf{v}^{k-1} \leftarrow \text{diag}(\mathcal{P}'_\infty(\mathbf{s}^k))\mathbf{r}^k$
6:   $\mathbf{r}^{k-1} \leftarrow \mathbf{v}^{k-1} - \alpha\gamma^2 \mathbf{D}_{tk}\mathbf{D}_{tk}^T\mathbf{v}^{k-1}$
7:   for $\ell = 1, 2, 3, \ldots, L$ do
8:    if $k = K$ then
9:     $\mathbf{q}_{k\ell} \leftarrow \gamma(\mathcal{P}_\infty(\mathbf{z}^k_\ell) \bullet (\mathbf{x} - \mathbf{x}^t)) + \alpha\gamma\left[(\mathbf{v}^{k-1}_\ell \bullet (\mathbf{z}^t - \gamma \mathbf{D}^T_{tk}\mathbf{s}^k)) - \gamma(\mathbf{s}^k_\ell \bullet (\mathbf{D}^T_{tk}\mathbf{v}^{k-1}))\right]$
10:    else
11:     $\mathbf{q}_{k\ell} \leftarrow \alpha\gamma\left[(\mathbf{v}^{k-1}_\ell \bullet (\mathbf{z}^t - \gamma \mathbf{D}^T_{tk}\mathbf{s}^k)) - \gamma(\mathbf{s}^k_\ell \bullet (\mathbf{D}^T_{tk}\mathbf{v}^{k-1}))\right]$
12: output: gradients $\{\nabla \mathcal{E}(\mathbf{D}_{tk})\}_{tk}$

FIG. 6

SPARSITY ENFORCING NEURAL NETWORK

FIELD

The present disclosure generally relates to image reconstruction, and more particularly, to image reconstruction using a neural network.

BACKGROUND

In signal processing, reconstruction usually means the determination of an original continuous signal from a sequence of measurements. For example, image reconstruction develops tools for numerically reconstructing images of a scene from measurements of the scene. The number of physical measurements provided by an imaging instrument is often limited due the hardware constraints. The image reconstruction considers the case when the total number of measurements falls below the number of pixels/voxels in the image. This makes image reconstruction an underdetermined problem with fewer measurements than unknowns. Hence, the image reconstruction is an ill-posed inverse problem. Several methods, such as iterative reconstruction and filtered back projection, have been developed to undress this problem.

Iterative reconstruction refers to iterative methods used to reconstruct 2D and 3D images in certain imaging techniques. The iterative reconstruction techniques are usually a better, but computationally more expensive alternative to the common filtered back projection, which directly calculates the image in a single reconstruction step. Modern fast computations and massive parallelism makes the iterative reconstruction more practical, but still challenging to deploy due to factors including the high computational cost of the forward and adjoint operators and the difficulty of hyper parameter selection.

Accordingly, there is a need for a neural network for performing reconstruction of a signal, for example, an image of a scene, from measurements of the scene.

SUMMARY

Embodiments of the present disclosure provide for systems and methods for image reconstruction, and more particularly, to image reconstruction using a neural network.

The present disclosure looks to further develop and improve approaches for modeling and understanding sensor data originating from dynamical systems. By non-limiting example, dynamical systems may include airflow sensing, material property sensing in complex media, and video segmentation and tracking. At least one aspect of the present disclosure includes further improving sensing capabilities for such systems, by exploiting their dynamic behavior, among other things.

Initially, we started experimenting with physical measurements gathered by imaging instruments, and we learned such approaches are limited due to hardware constraints. The hardware constraints made image reconstruction an underdetermined problem with fewer measurements than unknowns, and we further learned that image reconstruction is an ill-posed inverse problem. An inverse problem is ill-posed when the measurements are not sufficient to uniquely describe the image and additional constraints on the image are required.

Embodiments of the present disclosure are based on the realization that a neural network (NN) can be used for performing reconstruction of a signal, from measurements of the scene, wherein the signal is from an image of a scene. For example, the NN of the present disclosure can produce a signal x from measurements y that uses a small number of training examples to find a representation of a class of signals x that is sparse. As referred herein, an image can be at least a two-dimensional signal, a three-dimensional signal and the like.

Specifically, we realized the image reconstruction methods of the present disclosure can use redundancies in the image by introducing specific constraints into the reconstruction. However, we realized such constraints can be decided in advance by using modality specific prior knowledge of sparsity of the image, such as total variation (TV) or wavelet regularization of the image. We further realized it can be beneficial to learn the constraints from the measurements themselves, because data-driven constraints can increase the accuracy of the image reconstruction.

Further, embodiments of the present disclosure are based on the recognition that neural networks (NN), such as convolutional neural networks (CNN), can be trained to learn the sparsity constraints on the specific images. Moreover, the image reconstruction that uses those sparsity constraints can also be performed using a NN. Thus, in theory, both neural networks can be connected into a common dual-purpose neural network which can be jointly trained in an end-to-end fashion. In practice, however, we learned designing such a common network that performed concurrently the tasks of determining sparsity constraints and enforcing the sparsity constraints for image reconstruction, proved to be challenging. At least one reason this is difficult is because we learned through experimentation that the combination of neural networks (NNs) with additional processing steps can prevent taking an advantage of the ability of NN to be trained in the end-to-end fashion, which can provide for a streamline along with producing a data driven solution for the entire process of the image reconstruction. In other words, combining neural networks (NNs) with additional processing steps such training, we found requires too much of computational and time resources to be practical for use in today applications.

To overcome these challenges, we needed to further experiment and learn more about neural networks. Here are some of the things we learned, for example, neural networks are a family of models inspired by biological neural networks and are used to estimate or approximate functions that can depend on a large number of inputs and are generally unknown. Neural networks are generally presented as systems of interconnected nodes or "neurons" that exchange messages between each other. Each node being associated with a function for transforming the message. This function is usually non-linear to form a non-linear part of message transformation. Each connection between the nodes is associated with a numeric weight for scaling of the messages to form a linear part of message transformation. Typically, the functions are fixed and predetermined for all nodes, e.g., selected by a designer of the neural network. Examples of the functions typically selected for the nodes include the sigmoid and rectifier functions. We further learned that the neural networks can be trained to reduce the difference between the images reconstructed by a neural network and the ground truth images. However, while ill-posedness of the problem implies an infinite number of possible images fitting the measurements, at least one aspect of the uniqueness of the present disclosure's solution is being enforced with sparsity.

To that end, we realized if the neural network enforces general sparsity on the reconstructed image, e.g., in a transform domain. Such an enforcement can be seen as an analogous to first learning specific sparsity constraints, and next enforcing the learned sparsity constraints during the image reconstruction. Thus, we realized that the dual-purpose neural network can be replaced with Sparsity Enforcing Neural Network (SENN) that has a single task of reconstructing a sparse image in a suitable transform domain from the measurements.

The present disclosure is also based on another realization that the functions used by the neural networks, such as the sigmoid and rectifier functions, can be used for their flexibility and adaptability for different applications. However, those functions are ill-suited for enforcing sparsity on a reconstructed image. To that end, some embodiments of the present disclosure replace sigmoid and rectifier functions with a different non-linear function which is better suited for sparsity enforcement.

For example, one embodiment associates at least some nodes of the neural network with a non-linear a dual-projection function that limits the input signal if that signal exceeds the threshold. This particular embodiment is based on recognition that the dual-projection function enforces sparsity on the reconstructed image. Dual-projection function corresponds to the projection onto the dual norm of some $L_p$ vector norm with p<2. For a vector x of N elements, $L_p$ vector norm is defined as $$\|x\|_{L_p} = \left( \sum_{n=1}^{N} |x_n|^p \right)^{\frac{1}{p}}$$

Since, $L_p$-norm with p<2 mathematically enforces sparsity in a vector, by incorporating the dual-projection function into the NN or CNN, we are directly imposing sparisity constraints on the image.

Accordingly, one embodiment of the present disclosure reconstructs an image of a scene from measurements of the scene using a Sparsity Enforcing Neural Network (SENN) formed by layers of nodes propagating messages through the layers. At least one node of the neural network modifies an incoming message with a sparsity enforcing non-linear function to produce an outgoing message and propagates the outgoing message to another node. In some embodiments, the non-linear function is a dual-projection function that limits an amount of input of the signal, if that signal exceeds the threshold. Examples of such a dual-projection function can include a dual of $L_p$, wherein p>=1.

We explored using a neural network approach in training artificial neural networks that could employ some form of gradient descent, by using backpropagation to compute the actual gradients. This could be done by taking a derivative of a cost function with respect to network parameters and then changing those parameters in a gradient-related direction.

However, we discovered another realization that due to specialized functions of the nodes of the SENN, the weights also should be updated in a special manner. To that end, some embodiments of the present disclosure use a sparsity enforcing error-back propagation to train at least some weights of the SENN. Sparsity enforcing error-back propagation is derived by taking into account the specific structure of SENN.

Some embodiments are based on recognition that the sparsity of the image depends on the type of the sensor acquiring the measurements of the scene. Specifically, in an imaging inverse problem y=Hx+e aims to recover the unknown image $x \in R^N$ from the noisy measurements $y \in R^M$, the observation matrix $H \in R^{M \times N}$ is known and models the response of the sensor, i.e., the type of the sensor acquiring the measurements, while the vector $e \in R^M$ represents the unknown noise in the measurements.

Some embodiments are based on realization that the observation matrix H relates the image to the measurements in a linear manner and, thus, can be included directly in the SENN as the weights of the nodes. To that end, some embodiments associate at least some node with the values of the observation matrix. For example, the values of those weights associated with the observation matrix are I-$\gamma H^T H$, wherein $\gamma$>0 is a parameter, I is the identity matrix and $H^T$ denotes the transpose of the observation matrix.

In one embodiment, during the training of the SENN, the weights associated with the observation matrix are not changed, i.e. remain constant. This embodiment directly reflects the type of the sensor in the SENN. By non-limiting example, some of the types of sensors that could be used with the present disclosure can include optical sensors, LIDAR, and radar. Alternative embodiment initializes the weights with the values indicative of the values of observation matrix, but allows the update of those values during the training. This embodiment is based on the understanding that the calibration parameters of the sensor might change during the operation and this can be accounted for by additional training.

Some embodiments are based on recognition that the sparsity of the images varies among different types of the scene. For example, the sparsity in the images of faces differ from the sparsity in images of buildings. To that end, some embodiments train different neural networks for different types of images. Those embodiments allow selecting a neural network based on the type of the measured scene to improve the image reconstruction. At least one aspect of some of the embodiments may include the NN being a sparsity enforcing neural network (SENN).

At least one embodiment of the present disclosure includes a computer implemented image reconstruction system including an input interface to receive measurements of a scene. A memory to store a neural network (NN) formed by layers of nodes propagating messages through the layers. Wherein at least one node of the NN modifies an incoming message with a non-linear function to produce an outgoing message and propagates the outgoing message to another node of the NN. Wherein the non-linear function is a dual-projection function that limits the amplitude of the incoming message if the incoming message exceeds a threshold. Such that, the NN is trained to reconstruct an image of the scene from the measurements of the scene. A processor to process the measurements with the NN to reconstruct the image of the scene. Finally, an output interface to render the reconstructed image of the scene.

According to another embodiment of the present disclosure, a method for image reconstruction. The method uses a processor coupled to a memory storing a neural network (NN) formed by layers of nodes propagating messages through the layers. Wherein at least one node of the NN modifies an incoming message with a non-linear function to produce an outgoing message and propagates the outgoing message to another node of the NN. Further, wherein the non-linear function is a dual-projection function that limits the amplitude of the incoming message if the incoming message exceeds a threshold. Such that the NN is trained to reconstruct an image of the scene from the measurements of the scene, wherein the processor is coupled with stored instructions implementing the method. Wherein the instructions, when executed by the processor carry out at least some steps of the method. The method includes receiving measurements of a scene. Processing the measurements with the NN to reconstruct the image of the scene, and rendering the reconstructed image of the scene.

According to another embodiment of the present disclosure, a non-transitory computer readable storage medium embodied thereon a program executable by a processor for performing a method. The method including receiving measurements of a scene. Processing the measurements with a neural network (NN) to reconstruct the image of the scene, wherein the NN is formed by layers of nodes propagating messages through the layers. Wherein at least one node of the NN modifies an incoming message with a non-linear function to produce an outgoing message and propagates the outgoing message to another node of the NN. Such that the non-linear function is a dual-projection function that limits the amplitude the incoming message if the incoming message exceeds a threshold. Further, wherein the NN is trained to reconstruct an image of the scene from the measurements of the scene, and then rendering the reconstructed image of the scene.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2C is a pseudocode for implementation of SENN according to one embodiment of the present disclosure;

FIG. 5 is a block diagram of illustrating the method of FIG. 1A, that can be implemented using an alternate computer or processor, according to embodiments of the present disclosure; and FIG. 6 is a pseudocode for implementation of sparsity-enforcing error backpropagation according to one embodiment of the present disclosure.

Figure 1A:
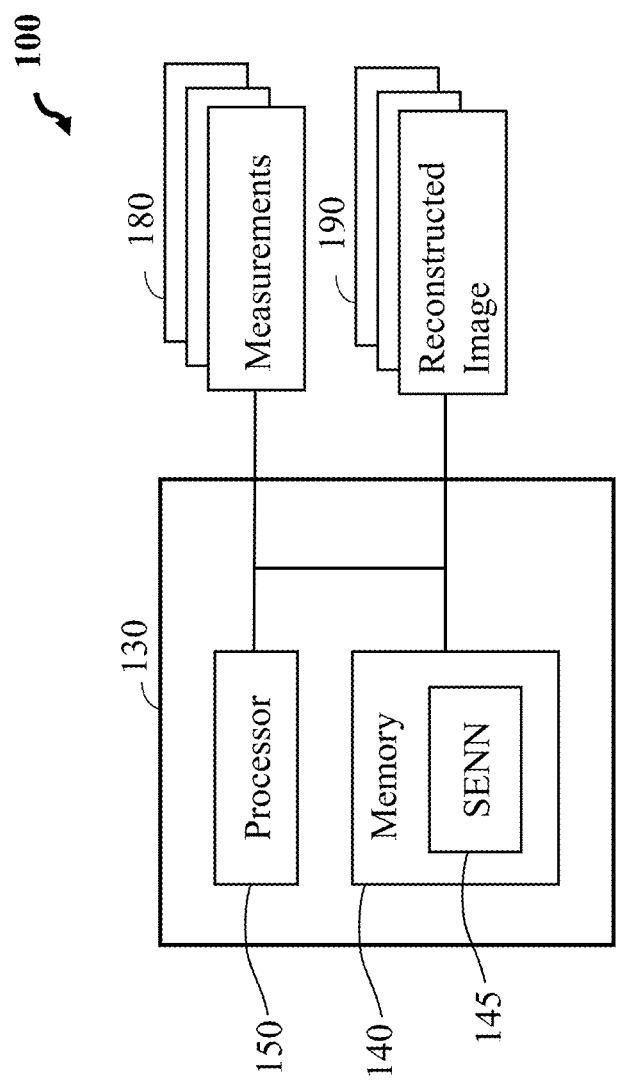
FIG. 1A is a block diagram of an image reconstruction system using sparsity enforcing neural network (SENN) in accordance with some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for systems and methods for image reconstruction using a neural network.

The present disclosure is based on the realization that a neural network (NN) can be used for performing reconstruction of a signal, from measurements of the scene, wherein the signal is from an image of a scene. For example, the NN of the present disclosure can produce a signal x from measurements y that uses a small number of training examples to find a representation of a class of signals x that is sparse. As referred herein, an image is at least a two-dimensional signal.

Specifically, we realized the image reconstruction methods of the present disclosure can use redundancies in the image by introducing specific constraints into the reconstruction. However, we realized such constraints can be decided in advance by using modality specific prior knowledge of sparsity of the image, such as total variation (TV) or wavelet regularization of the image. We further realized it can be beneficial to learn the constraints from the measurements themselves, because data-driven constraints can increase the accuracy of the image reconstruction.

Further, embodiments of the present disclosure are based on the recognition that neural networks (NN), such as convolutional neural networks (CNN), can be trained to learn the sparsity constraints on the specific images. Moreover, the image reconstruction that uses those sparsity constraints can also be performed using a NN. Thus, in theory, both neural networks can be connected into a common dual-purpose neural network that can be jointly trained in the end-to-end fashion. In practice, however, we learned designing a common network that performed concurrently the tasks of determining sparsity constraints and enforcing the sparsity constraints for image reconstruction proved to be challenging. At least one reason this is difficult is because we learned through experimentation that the combination of neural networks (NNs) with additional processing steps can prevent taking an advantage of the ability of NN to be trained in the end-to-end fashion, which can provide for a streamline along with producing a data driven solution for the entire process of the image reconstruction. In other words, combining neural networks (NNs) with additional processing steps such training, we found requires too much of computational and time resources to be practical for use in today applications.

To overcome these challenges, we needed to further experiment and learn more about neural networks. Here are some of the things we learned, for example, neural networks are a family of models inspired by biological neural networks and are used to estimate or approximate functions that can depend on a large number of inputs and are generally unknown. Neural networks are generally presented as systems of interconnected nodes or "neurons" that exchange messages between each other. Each node being associated with a function for transforming the message. This function is usually non-linear to form a non-linear part of message transformation. Each connection between the nodes is associated with a numeric weight for scaling of the messages to form a linear part of message transformation. Typically, the functions are fixed and predetermined for all nodes, e.g., selected by a designer of the neural network. Examples of the functions typically selected for the nodes include the sigmoid and rectifier functions. We further learned that the neural networks can be trained to reduce the difference between the images reconstructed by a neural network and the ground truth images. However, while ill-posedness of the problem implies an infinite number of possible images fitting the measurements, at least one aspect of the uniqueness of the present disclosure's solution is being enforced with sparsity.

To that end, we realized if the neural network enforces general sparsity on the reconstructed image, e.g., in a transform domain. Such an enforcement can be seen as an analogous to first learning specific sparsity constraints, and next enforcing the learned sparsity constraints during the image reconstruction. Thus, we realized that the dual-purpose neural network can be replaced with Sparsity Enforcing Neural Network (SENN) that has a single task of reconstructing a sparse image in a transforming domain from the measurements.

The present disclosure is also based on another realization that the functions used by the neural networks, such as the sigmoid and rectifier functions, can be used for their flexibility and adaptability to different applications. However, those functions are ill-suited for enforcing sparsity on reconstructed image. To that end, some embodiments of the present disclosure replace sigmoid and rectifier functions with a different non-linear function better suited for sparsity enforcement.

For example, at least embodiment associates at least some nodes of the neural network with a non-linear a dual-projection function that limits the input signal if that signal exceeds the threshold. This particular embodiment is based on recognition that the dual-projection function enforce sparsity on the reconstructed image by penalizing the $L_p$ vector norm with $1 \leq p < 2$. Extensive prior research in compressive sensing and sparse reconstruction has shown that by incorporating such $L_p$ norm penalty on the transformed image into the optimization, it is possible to obtain sparse results. While direct incorporation of $L_p$ norm penalty into a CNN is not straightforward, we realized that it is much easier to do in the dual optimization domain by using the dual-projection function.

Accordingly, another embodiment reconstructs an image of a scene from measurements of the scene using a Sparsity Enforcing Neural Network (SENN) formed by layers of nodes propagating messages through the layers. At least one node of the neural network modifies an incoming message with a sparsity enforcing non-linear function to produce an outgoing message and propagates the outgoing message to another node. In some embodiments, the non-linear function is a dual-projection function that limits the input signal if that signal exceeds the threshold. Examples of such a dual-projection function include a dual of $L_p$, wherein $p >= 1$.

In contrast with conventional functions of the neural networks, the numeric weights of the present disclosure are different due to the presence of a different nonlinearity, and tuned based on experience, making the neural networks of the present disclosure adaptive to inputs and capable of learning. We explored using a neural network approach in training artificial neural networks that could employ some form of gradient descent, by using backpropagation to compute the actual gradients. This could be done by taking a derivative of a cost function with respect to network parameters and then changing those parameters in a gradient-related direction.

However, some embodiments are based on another realization that due to specialized functions of the nodes of the Sparsity Enforcing Neural Network (SENN), the weights also should be updated in a special manner. To that end, some embodiments use a sparsity enforcing error-back propagation to train at least some weights of the SENN. Sparsity enforcing error-back propagation takes into account the structure of SENN and enables its efficient training given a set of ground-truth images. In particular, it computes the gradient of the loss function with respect to the weights used to enforce sparsity. Sparsity enforcing error-backpropagation is obtained by using the chain rule for computing the gradients backward from the output of SENN towards the input.

Some embodiments are based on recognition that the sparsity of the image depends on the type of the sensor acquiring the measurements of the scene. Specifically, in an imaging inverse problem y=Hx+e aims to recover the unknown image $x \in R^N$ from the noisy measurements $y \in R^M$, the observation matrix $H \in R^{M \times N}$ is known and models the response of the sensor, i.e., the type of the sensor acquiring the measurements, while the vector $e \in R^M$ represents the unknown noise in the measurements.

Further, some embodiments are based on realization that the observation matrix H relates the image to the measurements in a linear manner and, thus, can be included directly in the SENN as the weights of the nodes. To that end, some embodiments associate at least some node with the values of the observation matrix. For example, the values of those nodes associated with the observation matrix are $I-\gamma H^T H$ and $\gamma H^T$, wherein $\gamma > 0$ is a parameter, I is the identity matrix and $H^T$ denotes the transpose of the observation matrix.

In one embodiment, during the training of the SENN, the weights associated with the observation matrix are not changed, i.e. remain constant. This embodiment directly reflects the type of the sensor in the SENN. An alternative embodiment can initialize the weights with the values indicative of the values of observation matrix, but allows the update of those value during the training. This embodiment reflects the fact that the observation matrix may change during the operation due to changes in, for example, calibration parameters or operational uncertainties.

Some embodiments are based on recognition that the sparsity of the images varies among different types of the scene. For example, the sparsity in the images of faces differ from the sparsity in images of buildings. To that end, some embodiments train different neural networks for different types of images. Those embodiments allow selecting a neural network based on the type of the measured scene to improve the image reconstruction.

FIG. 1A shows a block diagram of a computer implemented image reconstruction system using Sparsity Enforcing Neural Network (SENN) in accordance with some embodiments of the present disclosure. The computer system 100 includes a computer/controller 130 having at least one processor 150 connected via bus 113 to a memory 140. The processor 150 can be a single core processor, a multi-core processor, a computing cluster, or any number of other configurations.

The memory 140 stores instructions that can be executed by the processor 150. The memory 140 stores a Sparsity Enforcing Neural Network (SENN) 145 formed by layers of nodes propagating messages through the layers. Wherein at least one node of the SENN 145 modifies an incoming message with a non-linear function to produce an outgoing message and propagates the outgoing message to another node of the SENN 145. Further, the non-linear function is a dual-projection function that limits the incoming message if the incoming message exceeds a threshold. The dual-projection function inherently imposes sparsity of the image in the transformed domain, due to its direct mathematical relationship to $L_p$ penalty with $1 \leq p < 2$. Traditional nonlinearities used in neural networks do not have such relationship and would not yield satisfactory results. Such that, the SENN 145 is trained to reconstruct an image of a scene obtained from measurements 180 of the scene. Wherein the processor 150 processes the measurements 180 with the SENN 145 so as to reconstruct the image 190 of the scene.

Figure 1B:
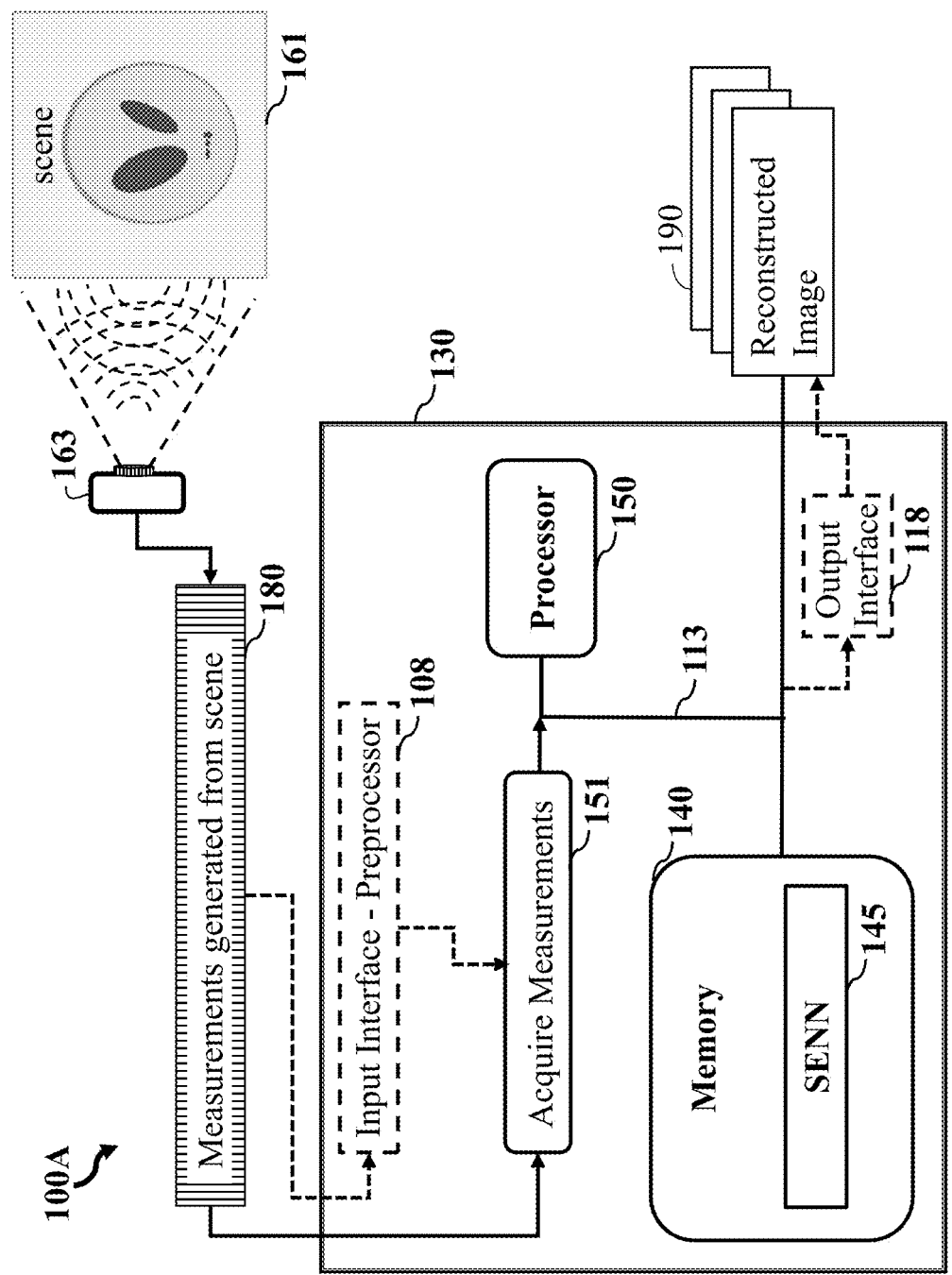
FIG. 1B is a schematic of image reconstruction using SENN in accordance with some embodiments of the present disclosure.

FIG. 1B shows a schematic of image reconstruction using SENN in accordance with some embodiments of the present disclosure. The computer system 100A can include the computer/controller 130 having the processor 150 connected via bus 113 to the memory 140. The memory 140 stores instructions that can be executed by the processor 150, as well as stores the SENN 145. Measurements 180 are obtained via device 163, i.e. camera such as a video camera, so the measurements 180 can be acquired 151 by the processor 150 through bus 113. The processor 150 processes the measurements 180 with the SENN 145, so as to reconstruct an image of the scene 161. It is possible that an input interface or preprocessor 108 can be used for processing the measurement data 180 prior to being acquired 151 and then processed by the processor 150. Finally, Image reconstruction is performed by the processor 150 executing the instructions stored in the memory 140. In some embodiments, SENN 145 processes measurements of the scene 161 collected with at least one sensor 163 to produce the reconstructed image of the scene 190.

Figure 2A:
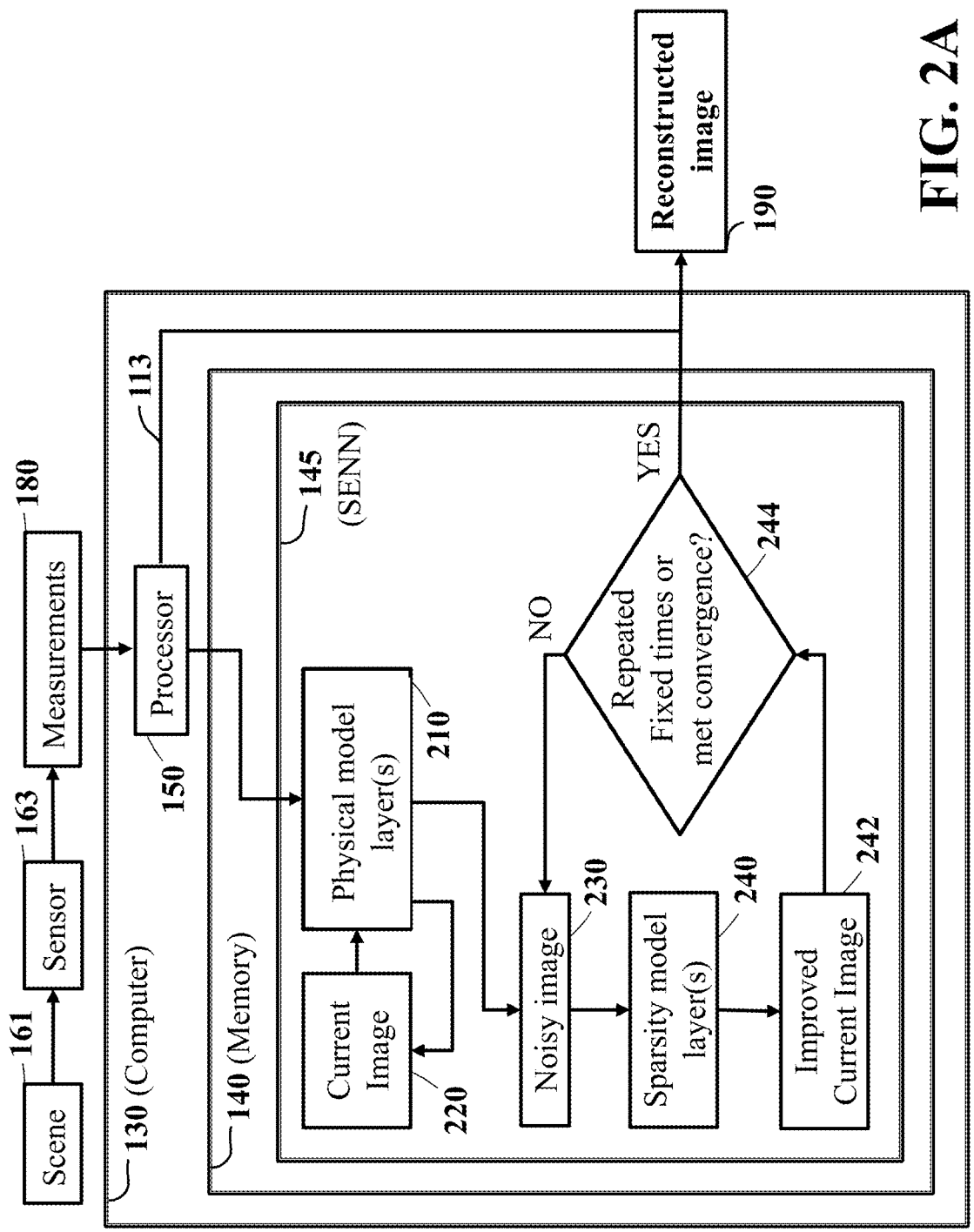
FIG. 2A is a block diagram of a computer-implemented method for image reconstruction using SENN according to one embodiment of the present disclosure.

FIG. 2A shows a block diagram of the computer implementation of SENN 145. Measurements 180 are passed eventually to the physical model layer 210 and combined with the current image 220 to produce the noisy image 230. The noisy image 230 is then processed by the sparsity model layers 240 to produce an improved version of the current image (i.e. improved current image) 242. This process is repeated a fixed number of times or until convergence is met 244. Finally, the SENN 145 outputs the reconstructed image 190.

Figure 2B:
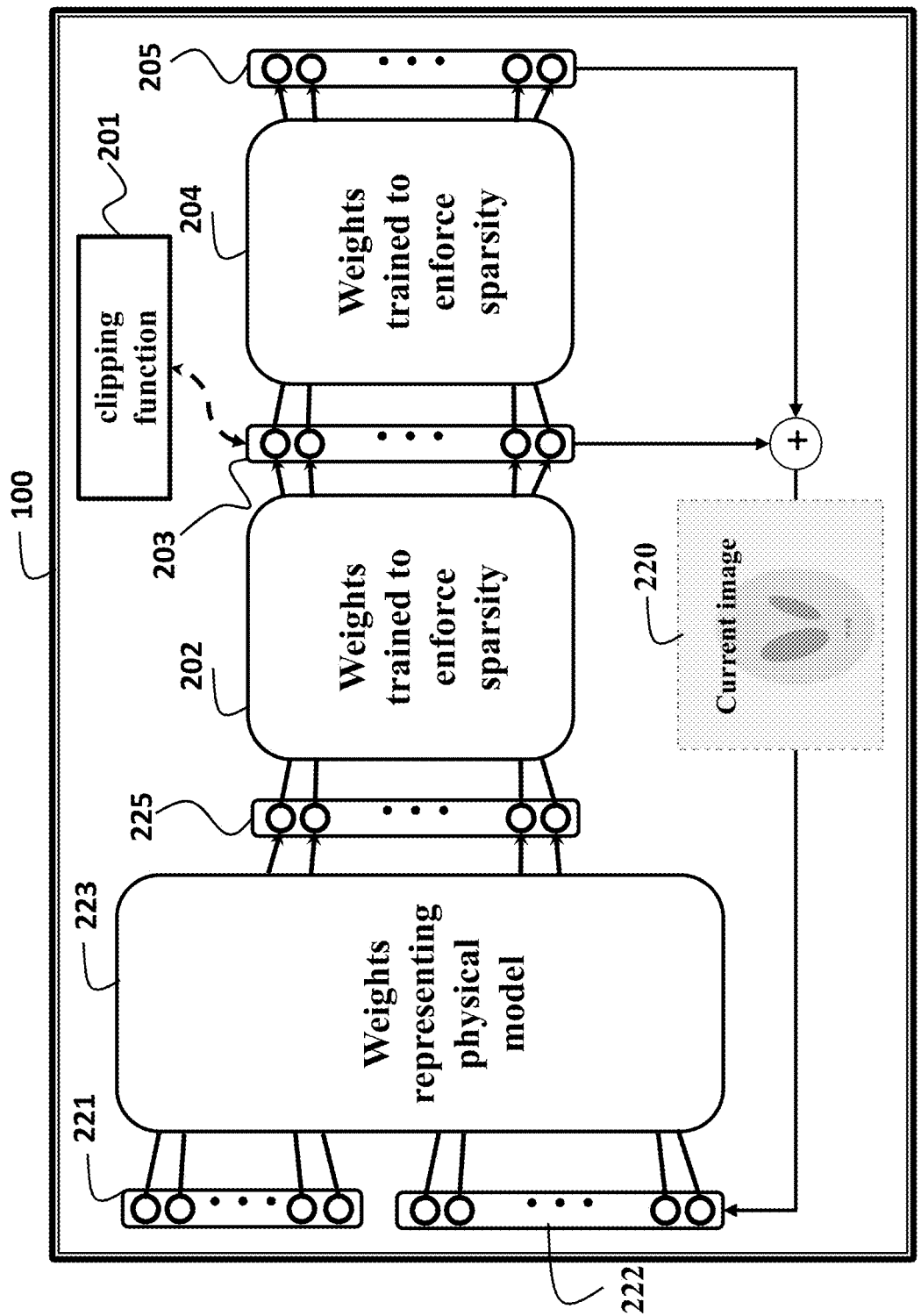
FIG. 2B is a schematic of a SENN according to one embodiment of the present disclosure.

FIG. 2B shows a schematic formulation of a neural network according to one embodiment of the present disclosure. The measurements at the input layer 221 and current image 220 at the input layer 222 are combined with a first subset of weights 223 indicative of the elements of the observation matrix representing the physics of the problem. Noisy image stored at the second layer 225 of the neural network pass through the weights 202 that are trained to enforce sparsity. Dual-projection function 201 is applied to at the output 203. Output layer 205 is obtained by combining the output 203 with weights trained to enforce sparsity 204. Current image 220 is obtained by adding output 203 with output 205.

Referring to FIG. 2C, the above operations of FIG. 2B are summarized in pseudocode in FIG. 2C.

Figure 2D:
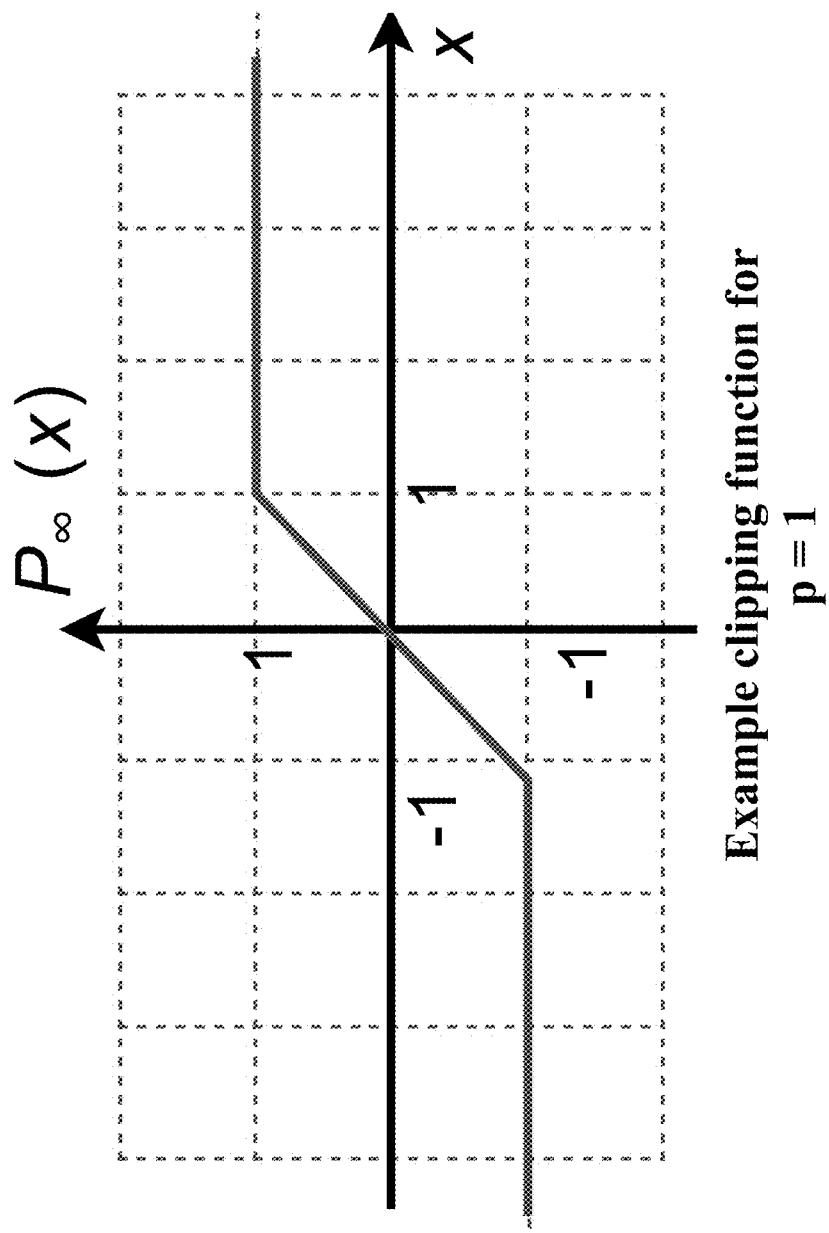
FIG. 2D is a schematic of the SoftThreshold function according to one embodiment of the present disclosure.

FIG. 2D shows an example of a dual-projection function 201 for p=1. Dual-projection function 201 is obtained by projecting the input onto $l_q$-ball corresponding to the sparsity enforcing penalty $l_p$ with $2 > p \geq 1$, where $$\frac{1}{q} + \frac{1}{p} = 1.$$

The value of q corresponding to the case p=1 is q=∞, and the projecting to $l_\infty$-ball can be represented with nonlinearity in FIG. 2D. Dual projection function simply applies the function in FIG. 2D to all the elements of the input vector.

Figure 3:
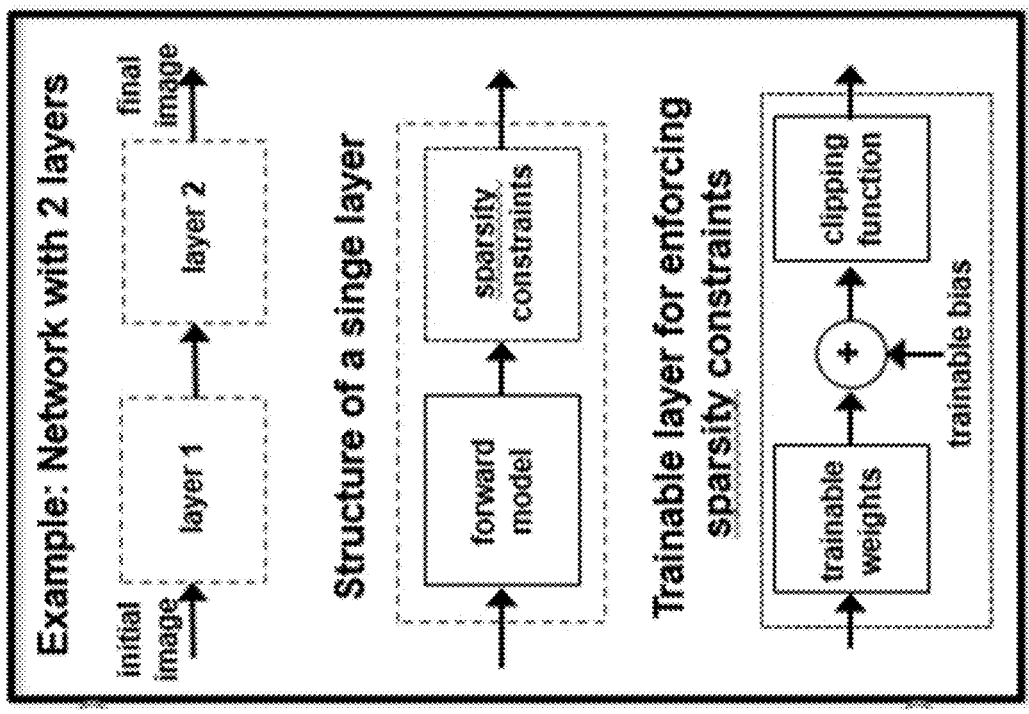
FIG. 3 is a block diagram of aspects for image reconstruction using SENN according to one embodiment of the present disclosure.

FIG. 3 is a block diagram of aspects for image reconstruction using SENN according to one embodiment of the present disclosure. FIG. 3 illustrates that the solution for the underdetermined problem of image reconstruction uses sparsity constraints that can be determined in advance or learned from the measurements. Neural networks, such as CNN, can be trained to learn the sparsity constraints on the specific images. The image reconstruction that uses those sparsity constraints can also be performed using a neural network. Thus, in theory, both neural networks can be joined. In practice, designing a common dual-purpose network that performed concurrently the tasks of determining sparsity constraints and enforcing the sparsity constraints for image reconstruction is difficult.

While ill-posedness of the problem implies an infinite number of possible images fitting the measurements, the uniqueness of the solution can be enforced with sparsity. To that end, it is realized that if the neural network enforces general sparsity on the reconstructed image, e.g., in a transform domain, such an enforcement can be seen as an analogous to first learning specific sparsity constraints and next enforcing the learned sparsity constraints during the image reconstruction. Thus, dual-purpose neural network can be replaced with sparsity enforcing neural network that has a single task of reconstructing a sparse image in transform domain from the measurements.

Still referring to FIG. 3, the functions used by the neural networks, such as the sigmoid and rectifier functions, are used for their flexibility and adaptability to different applications. However, those functions are ill-suited for enforcing sparsity on reconstructed image. To that end, some embodiments replace sigmoid and rectifier functions with a different non-linear function better suited for sparsity enforcement. Such a function is a dual-projection function that limits the incoming message if the incoming message exceeds a threshold. Example: a dual of $L_p$, wherein p>=1. Wherein, a new neural network modifying incoming messages with the dual-projection function can provide the solution to the problem.

Training

Our goal is to obtain a trainable variant of (3) by replacing the finite-difference filters of TV with K adaptable, iteration-dependent filters. The corresponding algorithm, illustrated in FIG. 1, can be interpreted as a convolutional neural network (CNN) of a particular structure with T×K filters $D_t \triangleq (D_{t1}, \ldots, D_{tK})$ that are learned from a set of L training examples $\{x_l, y_l\}_{l \in [1, \ldots, L]}$. The filters can be optimized by minimizing the error $$\hat{\theta} = \underset{\theta \in \Theta}{\operatorname{argmin}}\left\{\frac{1}{L}\sum_{\ell=1}^{L}\varepsilon_\ell(\theta)\right\} \text{ with } \varepsilon(\theta) \triangleq \|x - \hat{x}(y; \theta)\|_{\ell_2}^2 \quad (4)$$

over the training set, where $\theta = \{D_t\}_{t \in [1, \ldots, T]} \in \Theta$ denotes the set of desirable filters. For the problem of image denoising, end-to-end optimization can be performed with the error backpropagation algorithm that produces $$[\nabla \varepsilon_\ell(\theta)]_{tk} = \begin{cases} q_{tk} + \tau(g_k^T \cdot (x - \hat{x})) & \text{for } t = T \\ q_{tk} & \text{for } 1 \leq t \leq T-1 \end{cases},$$

using the following iteration for t=T, T-1, . . . , 1, $$v^{t-1} = \operatorname{diag}(\mathcal{P}'_\infty(z^t))r^t \quad (5a)$$

$$b^{t-1} = v^{t-1} - \gamma \tau^2 D_t D_t^T v^{t-1} \quad (5b)$$

$$r^{t-1} = \mu_t b^{t-1} + (1-\mu_{t+1})b^t \quad (5c)$$

$$q_{tk} = \gamma \tau [(v_k^{t-1} \bullet (y - \tau D_t^T s^t)) - \tau(s_k' \bullet (D_t^T v^{t-1}))] \quad (5d)$$

where • denotes filtering, $\mu_t = 1-(1-q_{t-1})/q_t$, $b^T=0$, and $r^T = \tau D_T(x-\hat{x})$. The parameters are update iteratively with the standard stochastic gradient method as $\theta \leftarrow \theta - \alpha \nabla \varepsilon_\ell(\theta)$.

We applied our method to image denoising by training T=10 iterations of the algorithm with K=9 iteration dependent kernels of size 6×6 pixels. For training, we used 400 images from Berkeley dataset cropped to 192×192 pixels. We evaluated the algorithm on 68 separate test images from the dataset and compared the results with three popular denoising algorithms (see Table I and FIG. 2-3). Our basic MATLAB implementation takes 0:69 and 3:27 seconds on images of 256×256 and 512×512 pixels, respectively, on an Apple iMac with a 4 GHz Intel Core i7 processor. We observe that our simple extension of TV significantly boosts the performance of the algorithm and makes it competitive with state-of-the-art denoising algorithms. The algorithm can be easily incorporated into FISTA and ADMM for solving more general inverse problems. Future work will address such extensions and further improve the performance by code optimization and considering more kernels. More generally, our work contributes to the recent efforts to boost the performance of imaging algorithms by incorporating latest ideas from deep learning.

Figure 4:
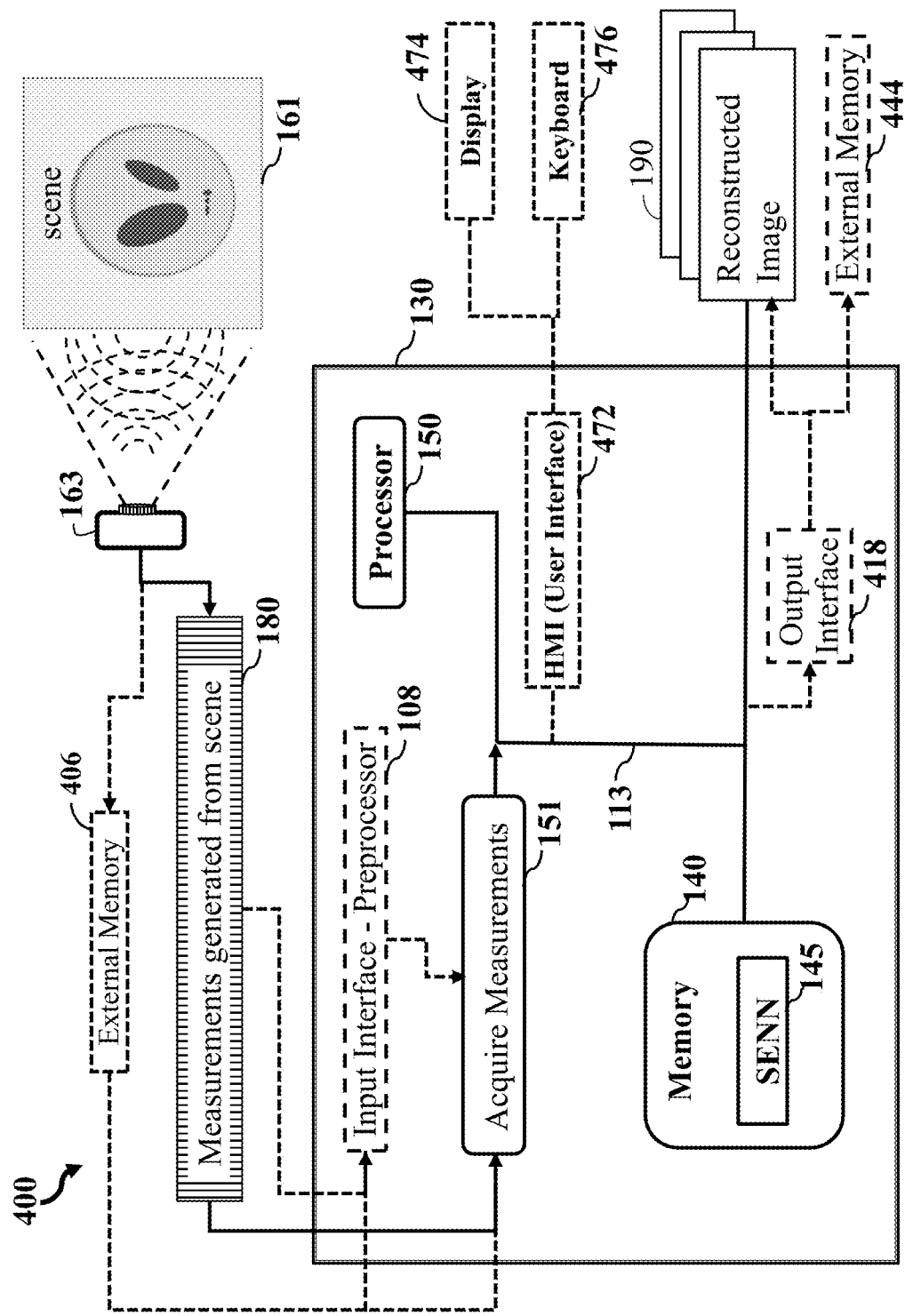
FIG. 4 is schematic of at least one method and system for detecting actions of objects, according to embodiments of the present disclosure.

FIG. 4 shows a schematic of image reconstruction using SENN in accordance with some embodiments of the present disclosure. The computer system 400 can include the computer/controller 130 having the processor 150 connected via bus 113 to the memory 140. The memory 140 stores instructions that can be executed by the processor 150, as well as stores the SENN 145. Measurements 180 are obtained via device 163, i.e. camera such as a video camera, so the measurements 180 can be acquired 151 by the processor 150 through bus 113. The processor 150 processes the measurements 180 with the SENN 145, so as to reconstruct an image of the scene 161. Finally, Image reconstruction is performed by the processor 150 executing the instructions stored in the memory 140. In some embodiments, SENN 145 processes measurements of the scene 161 collected with at least one sensor 163 to produce the reconstructed image of the scene 190.

FIG. 4 also can include an external memory 406 that can store the measurements 180, which may be processed at some time later. Further, an input interface or preprocessor 108 can be used for processing the measurement data 180 prior to being acquired 151 and then processed by the processor 150. Also contemplated is having a Human User Interface (HMI) 472 that can be connected to a display 474 and keyboard 476. Finally, image reconstruction can be performed by the processor 150 executing the instructions stored in the memory 140. In some embodiments, SENN 145 processes measurements of the scene 161 collected with at least one sensor 163 to produce the reconstructed image of the scene 190. Wherein the reconstructed image 190 can be rendered via output interface 418 to an external memory 444.

Still referring to FIG. 4, it is contemplated sensor 163 could gather other data such as time, temperature, and other data related to the scene 161. Further, video 163 can provide the measurement data 180 of the scene 161 as a sequence of images, wherein each image includes pixels.

Features

Aspects of the of the present disclosure can include the image reconstruction system having the dual-projection function with a dual of $L_p$, wherein p>=1.

Other aspects of the image reconstruction system can include the input interface includes a sensor to acquire the measurements, and wherein a set of weights of the SENN includes a first subset of weights indicative of elements of an observation matrix representing physics of a structure of the sensor and a second subset of weights trained to enforce the sparsity of the reconstructed image. Wherein each weight in the first subset of weights can equal a function of a corresponding element of the observation matrix. Further, that function corresponds to a transformation of the observation matrix H based on I−γH$^T$ H and γH$^T$, wherein γ>0 is a parameter, I is the identity matrix and H$^T$ denotes the transpose of the observation matrix. Wherein the layers of the nodes can include a first set of layers associated with the first subset of weights and a second set of layers associated with the second set of weights, and wherein the layers from the first set of layers alternate with the layers from the second set of layers. Wherein the weights in the first subset of weights can remain constant during the training of the SENN. Wherein the SENN is trained using sparsity-enforcing error backpropagation.

Another aspect of the present disclosure can include the memory stores a set of SENNs trained for different types of images, wherein the processor determines a type of an image represented by the measurements, and selects the SENN corresponding to the determined type of the image for the image reconstruction. Wherein the different types of images include a combination of at least two types of images, such that the at least two types of images include intensity and depth images.

FIG. 5 is a block diagram of illustrating the method of FIG. 1B, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 549 in communication with the processor 540 and the computer readable memory 512, acquires and stores the measuring data in the computer readable memory 512 upon receiving an input from a surface, keyboard surface, of the user interface 557 by a user.

Contemplated is that the memory 512 can store instructions that are executable by the processor, historical data, and any data to that can be utilized by the methods and systems of the present disclosure. The processor 540 can be a single core processor, a multi-core processor, a computing cluster, or any number of other configurations. The processor 540 can be connected through a bus 556 to one or more input and output devices. The memory 512 can include random access memory (RAM), read only memory (ROM), flash memory, or any other suitable memory systems.

Still referring to FIG. 5, a storage device 558 can be adapted to store supplementary data and/or software modules used by the processor. For example, the storage device 558 can store historical device data and other related device data such as manuals for the devices, wherein the devices are sensing device capable of obtaining measured data as mentioned above regarding the present disclosure. Additionally, or alternatively, the storage device 558 can store historical data similar to the measuring data. The storage device 558 can include a hard drive, an optical drive, a thumb-drive, an array of drives, or any combinations thereof.

The system can be linked through the bus 556 optionally to a display interface (not shown) adapted to connect the system to a display device (not shown), wherein the display device can include a computer monitor, camera, television, projector, or mobile device, among others.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein measuring data or other data, among other things, can be rendered on a third party display device, third party imaging device, and/or third party printing device outside of the computer 511.

Still referring to FIG. 5, the measuring data or other data, among other things, can be transmitted over a communication channel of the network 536, and/or stored within the storage system 558 for storage and/or further processing. Further, the measuring data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. The computer 511 may be connected to other external computers 542. An output interface 509 may be used to output the processed data from the processor 540.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A computer implemented image reconstruction system for reconstructing images from data acquired by at least one sensor that is one of an optical sensor, LIDAR sensor or radar sensor, wherein an input interface receives the data that includes measurements of a scene, comprising:
   a sparsity enforcing neural network (SENN), includes a first subset of weights indicative of elements of an observation matrix representing physics of a structure of the at least one sensor and a second subset of weights, wherein the SENN is formed by layers of nodes propagating messages through the layers, at least one node of the SENN modifies an incoming message with a non-linear function to produce an outgoing message and propagates the outgoing message to another node of the SENN, such that the non-linear function is a dual-projection function that limits the amplitude of the incoming message if the incoming message exceeds a threshold, wherein the SENN is trained to enforce the sparsity of transform domain coefficients of the reconstructed image, where the transform domain coefficients are duals of the outgoing messages between the nodes of the SENN, such that the transform domain coefficients are determined from second subset of the trained weights D, the outgoing messages g, and the estimate of the reconstructed image z, such that, the determining of the transform domain coefficients are obtained by the mathematical relation $D(D^T g-z)$, and wherein the SENN is trained to reconstruct an image of the scene from the measurements of the scene;

a processor in communication with the input interface, to process the measurements with the SENN to reconstruct the image of the scene; and an output interface in communication with the processor to render the reconstructed image of the scene.

2. The image reconstruction system of claim 1, wherein the dual-projection function includes a dual of $L_p$, wherein $p>=1$, such that $L_p$ is a norm distance function and p is a parameter that specifies the norm distance function.

3. The image reconstruction system of claim 1, wherein each weight in the first subset of weights equals a function of a corresponding element of the observation matrix.

4. The image reconstruction system of claim 3, wherein the function corresponds to a transformation of the observation matrix H based on $I-\gamma H^T H$ and $\gamma H^T$, wherein $\gamma>0$ is a parameter, I is the identity matrix and $H^T$ denotes the transpose of the observation matrix, and γ is a parameter is associated with an amount of a numeric weight for scaling the reconstructed image that is associated with the observation matrix.

5. The image reconstruction system of claim 1, wherein the layers of the nodes include a first set of layers associated with the first subset of weights and a second set of layers associated with the second set of weights, and wherein the layers from the first set of layers alternate with the layers from the second set of layers.

6. The image reconstruction system of claim 1, wherein the weights in the first subset of weights remain constant during the training of the SENN.

7. The image reconstruction system of claim 1, wherein the SENN is trained using sparsity-enforcing error back-propagation.

8. The image reconstruction system of claim 1, wherein a memory stores a set of SENNs trained for different types of images, wherein the processor determines a type of an image represented by the measurements, and selects the SENN corresponding to the determined type of the image for the image reconstruction.

9. The image reconstruction system of claim 8, wherein the different types of images include a combination of at least two types of images, such that the at least two types of images include intensity images and depth images.

10. A method for image reconstruction, steps of the method, comprising:

receiving measurements of a scene from sensor data via at least one sensor located in the scene, wherein the at least one sensor is one of an optical sensor, a LIDAR sensor or a radar sensor;

using a sparsity enforcing neural network (SENN) that includes a first subset of weights indicative of elements of an observation matrix representing physics of a structure of the at least one sensor and a second subset of weights, the SENN is formed by layers of nodes propagating messages through the layers, such that at least one node of the SENN modifies an incoming message with a non-linear function to produce an outgoing message and propagates the outgoing message to another node of the SENN, wherein the non-linear function is a dual-projection function that limits an amplitude of the incoming message if the incoming message exceeds a threshold, wherein the SENN is trained to enforce the sparsity of transform domain coefficients of the reconstructed image, where the transform domain coefficients are duals of the outgoing messages between the nodes of the SENN, such that the transform domain coefficients are determined from second subset of the trained weights D, the outgoing messages g, and the estimate of the reconstructed image z, such that, the determining of the transform domain coefficients are obtained by the mathematical relation $D(D^T g-z)$, and wherein the SENN is trained to reconstruct an image of the scene from the measurements of the scene;

processing the measurements with the SENN to reconstruct the image of the scene; and rendering the reconstructed image of the scene, wherein stored instructions in a memory implement the method, such that the stored instructions, when executed by a processor in communication with the memory, carry out the steps of the method.

11. The method of claim 10, wherein the dual-projection function includes a dual of $L_p$, wherein $p>=1$, such that $L_p$ is a norm distance function and p is a parameter that specifies the norm distance function.

12. The method of claim 10, wherein each weight in the first subset of weights equals a function of a corresponding element of the observation matrix, wherein the function corresponds to a transformation of the observation matrix H based on $I-\gamma H^T H$ and $\gamma H^T$, wherein $\gamma>0$ is a parameter, I is the identity matrix and $H^T$ denotes the transpose of the observation matrix, and γ is a parameter is associated with an amount of a numeric weight for scaling the reconstructed image that is associated with the observation matrix.

13. The method of claim 10, wherein the SENN is trained using sparsity-enforcing error back propagation.

14. The method of claim 10, wherein the memory stores a set of SENNs trained for different types of images, further comprising:

determining a type of an image represented by the measurements; and selecting the SENN corresponding to the determined type of the image for the image reconstruction.

15. A non-transitory computer readable storage medium embodied thereon a program executable by a processor for performing a method, the method comprising:

receiving measurements of a scene from sensor data via at least one sensor located in the scene, wherein the at least one sensor is one of an optical sensor, a LIDAR sensor or a radar sensor;

using a sparsity enforcing neural network (SENN) that includes a first subset of weights indicative of elements of an observation matrix representing physics of a structure of the at least one sensor and a second subset of weights, the SENN is formed by layers of nodes propagating messages through the layers, such that at least one node of the SENN modifies an incoming message with a non-linear function to produce an outgoing message and propagates the outgoing message to another node of the SENN, wherein the non-linear function is a dual-projection function that limits an amplitude of the incoming message if the incoming message exceeds a threshold, wherein the SENN is trained to enforce the sparsity of transform domain coefficients of the reconstructed image, where the transform domain coefficients are duals of the outgoing messages between the nodes of the SENN, such that the transform domain coefficients are determined from second subset of the trained weights D, the outgoing messages g, and the estimate of the reconstructed image z, such that, the determining of the transform domain coefficients are obtained by the mathematical relation $D(D^T g - z)$, and wherein the SENN is trained to reconstruct an image of the scene from the measurements of the scene;

processing the measurements with the SENN to reconstruct the image of the scene; and rendering the reconstructed image of the scene.

16. The method of claim 15, wherein the dual-projection function includes a dual of $L_p$, wherein p>=1, such that $L_p$ is a norm distance function and p is a parameter that specifies the norm distance function.

17. The method of claim 15, wherein the non-transitory computer readable storage medium stores a set of SENNs trained for different types of images, and wherein the method further comprises:

determining a type of an image represented by the measurements; and selecting the SENN corresponding to the determined type of the image for the image reconstruction.

\* \* \* \* \*